United States Patent [19]

Mistry et al.

[11] Patent Number: 5,326,804

[45] Date of Patent: Jul. 5, 1994

[54] ORGANOPOLYSILOXANE RUBBER COMPOSITION FOR COATING HIGH VOLTAGE ELECTRICAL INSULATORS HAVING IMPROVED ELECTRICAL PROPERTIES

[76] Inventors: Balwantrai Mistry, 49 Rhonda Rd., Unit 115, Guelph, Ontario, Canada, N1H 7A4; Edward A. Cherney, 28 Claymore Dr., Toronto, Ontario, Canada, M8Z 2S2; Seraj ul Huda, 329 Lake Promenade, Toronto, Ontario, Canada, M8W 1A6

[21] Appl. No.: 978,533

[22] Filed: Nov. 19, 1992

Related U.S. Application Data

[63] Continuation of Ser. No. 649,906, Feb. 1, 1991, abandoned.

[51] Int. Cl.$^5$ .................. C08L 83/04; C08K 9/06; C08K 3/22
[52] U.S. Cl. .................. 524/188; 524/178; 524/437; 524/464; 524/493
[58] Field of Search ........... 524/178, 188, 437, 464, 524/493

[56] References Cited

U.S. PATENT DOCUMENTS

| | | | |
|---|---|---|---|
| 3,464,951 | 9/1969 | Hittmair et al. | 524/188 |
| 4,657,967 | 4/1987 | Klosowski et al. | 524/493 |
| 4,822,830 | 4/1989 | Adkins | 523/213 |
| 5,023,295 | 6/1991 | Bosch et al. | 524/188 |
| 5,049,850 | 9/1991 | Evans | 524/437 |

FOREIGN PATENT DOCUMENTS

| | | | |
|---|---|---|---|
| 0481434 | 4/1992 | European Pat. Off. | 524/188 |
| 0278483 | 10/1990 | Japan | 524/188 |

*Primary Examiner*—Paul R. Michl
*Assistant Examiner*—Andrew E. C. Merriam

[57] ABSTRACT

The present invention provides for an organopolysiloxane rubber composition for coating high voltage electrical insulators comprising the product which is obtained by mixing 30 to 50 weight percent of a mixture of 40 to 44 weight percent of a polydimethyl siloxane fluid having a viscosity from 10 to 15 Pa.S at 25° C; 2.0 to 3.0 weight percent of a $SiO_2$ reinforcing filler with a specific gravity of 2.2 and a range of particle size of 0.5 to 10 microns; 1.0 to 3.0 weight percent of an organosilicone cross-linking agent; 0.5 to 2.0 weight percent of an adhesion promotoer; 0.1 to 0.2 weight percent of a dibutyltindilaurate condensation catalyst and 36 to 48 weight percent of alumina trihydrate, the alumina trihydrate having a median particle size of 13μm, containing 65.1 percent $Al_2O_3$, 34.5 percent combined $H_2O$, 0.3 percent $Ha_2O$, 0.02 percent CaO, 0.01 percent $SiO_2$ and having a specific gravity of 2.42, the alumina trihydrate being present in a proportion of 90 to 110 parts by weight of alumina trihydrate per 100 parts by weight of the polyorganosiloxane base, with 50 to 70 weight percent of a hydrocarbon solvent as a dispersion medium. The organopolysiloxane rubber composition of the present invention provides a coating for high voltage electrical insulators with greater resistance to leakage of electrical current.

11 Claims, 2 Drawing Sheets

ORGANOPOLYSILOXANE RUBBER COMPOSITION FOR COATING HIGH VOLTAGE ELECTRICAL INSULATORS HAVING IMPROVED ELECTRICAL PROPERTIES

This is a continuation application of application Ser. No. 07/649,906 filed on Feb. 1, 1991, now abandoned.

FIELD OF THE INVENTION

The present invention relates to a room temperature vulcanizable organopolysiloxane rubber composition having improved electrical properties for coating high voltage electrical insulators.

BACKGROUND OF THE INVENTION

Several organopolysiloxane rubber compositions for coating high voltage electrical insulators have been disclosed for improving the electrical characteristics of electrical insulators. For example, Niemi describes a method for preparing high voltage insulators in U.S. Pat. No. 4,476,155 in which a composition containing the product obtained by mixing a hydroxyl endblocked polydimethylsiloxane with aluminum trihydrate and a ketoxime functional silane, is applied to the outer surface of an insulator.

Adkins in U.S. Pat. No. 4,822,830 describes organopolysiloxane elastomers having improved adhesion, improved contact angle, accelerated cure rate, improved arc resistance, longer useful life, resistance to arcing and improved resistance to leakage of electrical current.

SUMMARY OF THE INVENTION

The present invention provides for an organopolysiloxane rubber composition for coating high voltage electrical insulators comprises the product which is obtained by mixing the following: a) 30 to 50 weight percent of a mixture of i) 40 to 44 weight percent of polydimethyl siloxane fluid of the formula $$HO\ [(CH_3)_2SiO]_nH$$

wherein n has an average value such that the viscosity is in the range, from 10 to 15 Pa.S at 25° C., ii) 2 to 3 weight percent of a reinforcing filler of the formula $$SiO_2$$

with a specific gravity of 2.2 and a range of particle size 0.5 to 10 microns, iii) 1 to 3 weight percent of an organosilicon crosslinking agent of the formula $$RSi(ON=CR'_2)_3$$

wherein R and R' represent a group of monovalent hydrocarbon radicals, iv) 0.5 to 2.0 weight percent of an adhesion promoter of the formula

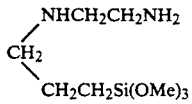

wherein Me is the methyl radical, v) 0.1 to 0.2 percent by weight of a condensation catalyst consisting of an organotin salt of carboxylic acid of the formula

vi) 90 to 100 parts by weight of alumina trihydrate per 100 parts by weight of the polyorganosiloxane base, the alumina trihydrate having a median particle size of 13μm, containing 65.1 percent $Al_2O_3$, 34.5 percent combined $H_2O$, 0.3 percent $Na_2O$, 0.02 percent CaO, 0.01 percent $SiO_2$ and having a specific gravity of 2.42, with b) 50 to 70 weight percent of a hydrocarbon solvent is used as a dispersion medium for the above composition.

The organopolysiloxane rubber composition of the present invention provides a coating for high voltage electrical insulators with all of the advantages of the prior art and greater resistance to leakage of electrical current.

BRIEF DESCRIPTION OF THE DRAWINGS

The above, as well as other advantages and features of the present invention will be described in greater detail according to the preferred embodiments of the present invention in which.

DETAILED DESCRIPTION OF THE INVENTION

Figure 1:
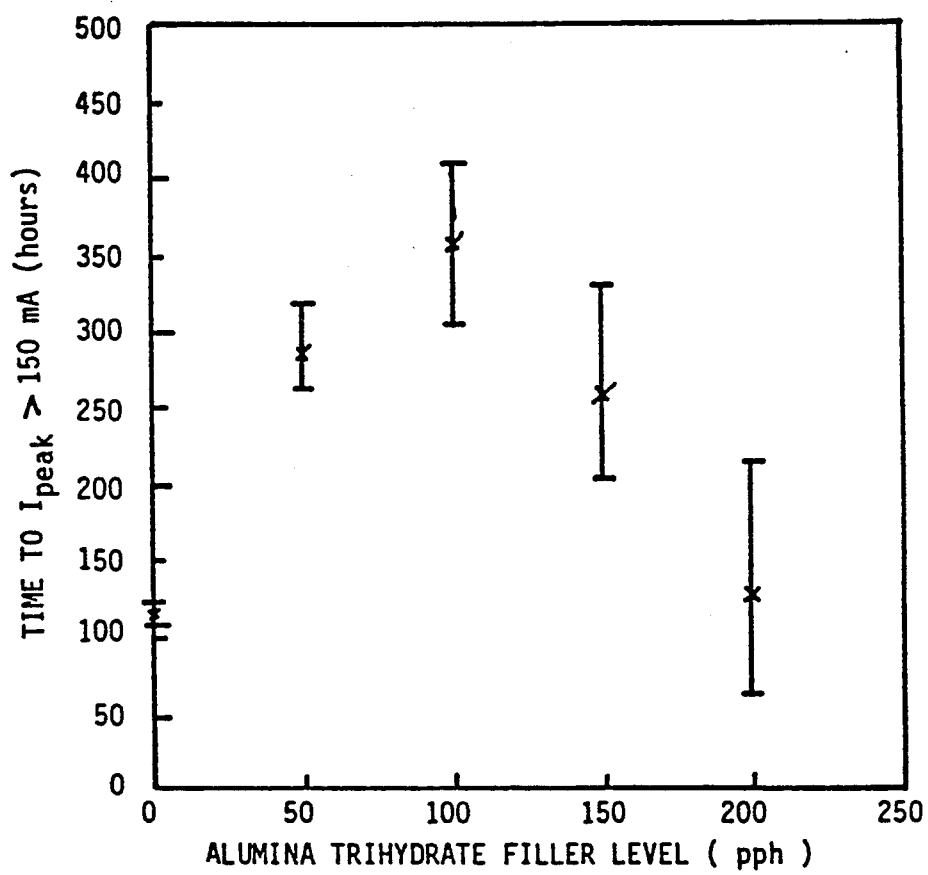
FIG. 1 shows the time required to develop leakage current in excess of 150 mA over the surface of a coated insulator as a function of the amount of filler at a voltage stress of 0.5 kV/cm.
Figure 2:
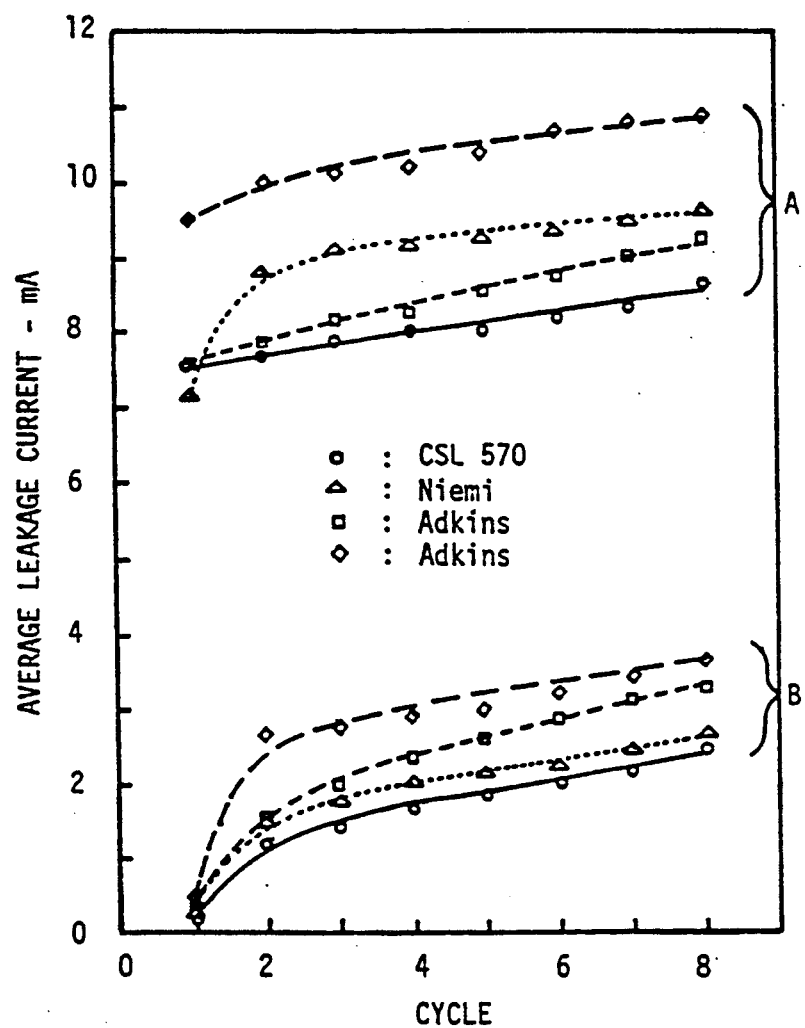
FIG. 2 compares the coating of the present invention to prior art coating for the progression of leakage current with salt-fog cycles after one hour (in B) and after ten hours (in A) of salt-fog.

The present invention relates to a method and composition for improving the electrical properties of a organopolysiloxane rubber composition for coating high voltage electrical insulators.

Electrical insulators for high voltage use are traditionally made of glass or porcelain as these materials are of low cost, high quality electrically and under normal conditions, have a long life in service. With the power transmissions moving to higher and higher voltages, composite insulators made from non-ceramic materials have been developed and used in commercial applications.

An insulator such as the suspension insulator in a high voltage power transmission line is designed to keep to a minimum current discharges under normal conditions. However, when the insulator surface becomes contaminated, leakage current can develop along the surface of the insulator. The amount of this leakage current depends upon the voltage stress and the conductivity of the film of contaminant on the surface of the insulator. These leakage currents can incur or cause arcing on the surface of the insulator which can have serious effects upon the composite insulator surface such as the formation of free carbon and non volatile semi-conductor materials and may eventually result in a conducting path forming across the surface of the insulator effectively shorting out the insulator.

The outer surface of an electrical insulator is the most important part of the insulator as this is the part of the insulator that is subjected to the effects of electrical voltage stress, leakage currents and weathering. The room temperature curable silicone composition of the present invention used to coat the outer surface of insulators provides for improved insulation that is arc resistant, hydrophobic and resistant to the stresses imposed upon outdoor electrical insulator. The composition provides a coating of electrically non conductive material on the surface of the insulator which protects the underlying insulator material.

The compositions for coating high voltage electrical insulators of the present invention contain 40 to 44 weight percent, more preferably 42 to 44 weight percent, most preferably 43 to 44 weight percent of polydimethylsiloxane fluid of the formula $HO[(CH_3)_2SiO]_nH$ wherein n has an average value such that the viscosity is in the range from 10 to 15 Pa.S at 25° C. The polydimethylsiloxane fluid may contain small amounts of cyclic materials and monomethylsiloxane units such as found in commercial production of polydimethylsiloxane fluids. The fluid may also have the methyl radical in the polymer chain replaced with other radicals in very small amounts such as impurities found in commercial materials, but the preferred fluid contains only polydimethylsiloxane.

The composition also contains 2 to 3 weight percent of a reinforcing filler of $SiO_2$ with a specific gravity of 2.2 and a range of particle size of 0.5 to 10 microns.

The composition also contains 1 to 3 weight percent, more preferably 2 to 3 weight percent of an organosilicon cross linking agent of formula $RSi(ON=CR'_2)_3$ wherein R and R' represent a group of monovalent hydrocarbon radicals. Each R and R' can be a monovalent hydrocarbon radical such as for example an alkyl radical such as methyl, ethyl, propyl and butyl, or an alkylene radical such as vinyl and allyl. The preferred R and R' are alkyl radicals, most preferably methyl and ethyl radicals.

The composition also contains 0.5 to 2 weight percent of an adhesion promoter, preferably N-(2-aminoethyl-3-aminopropyl)trimethoxysilane.

The composition additionally contains 0.1 to 0.2 weight percent of a condensation catalyst consisting of an organotin salt of carboxylic acid, preferably of the formula

$(C_4H_9)_2Sn(OCOC_{10}H_{20}CH_3)_2$.

The composition also contains 90 to 100 parts by weight of alumina trihydrate per 100 parts by weight of the polyorganosiloxane base, the alumina trihydrate having a median particle size of 13μm, containing 65.1 percent $Al_2O_3$, 34.5 percent combined $H_2O$, 0.3 percent $Na_2O$, 0.02 percent $CaO$, 0.01 percent $SiO_2$ and having a specific gravity of 2.42.

The composition also contains 50 to 70 weight percent of a hydrocarbon solvent to be used as a dispersion medium for the composition. The hydrocarbon solvent can be a non-chlorinated solvent such as naphtha or mineral spirits or a chlorinated hydrocarbon solvent. The preferred solvent is a chlorinated hydrocarbon solvent preferably a chloroalkyl, more preferably a chloroethane, most preferably 1,1,1-trichloroethane.

The composition may contain other optional ingredients such as pigments and other fillers in minor amounts provided that the addition of the ingredients does not cause degration of the arc-track resistance or leakage current suppression of the cured coating made from the composition. One commonly utilized optional ingredient is a pigment, preferably a grey pigment, most preferably a titanium dioxide and carbon black pigment present in an amount of from 3 to 4 weight percent.

The organopolysiloxane composition of the present invention is prepared by mixing the ingredients together in the absence of moisture. The silane is moisture sensitive and will undergo cross-linking in the presence of moisture such that the mixture must be essentially absent of free moisture when the silane is added and maintained in a moisture free state until cure is desired.

A preferred method of mixing comprises mixing the polysiloxane polymer with the reinforcing filler. Thereafter, the organosilicone cross-linking agent and the adhesion promoter are added under a nitrogen atmosphere. The alumina trihydrate is thereafter added in stages and mixed, and the solvent added to the mixture under a nitrogen atmosphere. Finally, the condensation catalyst is added to the mixture.

The surface of the insulator is coated with the composition by conventional methods such as dipping, brushing or spraying. The composition can be adjusted to the consistency suitable for use in these methods by the adjustment of the amount of solvent utilized in the composition. Preferably, the insulators are coated with a coating having an average thickness of 0.5±0.05 mm through multiple dips in or coats of the composition. After the coating is formed on the surface of the insulator, the insulator is exposed to normal atmosphere for cross-linking of the coating.

The improved coating insulator of the present invention is capable of operating under a higher voltage stress in the presence of moisture such as rain or fog in combination with contaminated atmospheres such are as found in industrial locations, along sea coast where salt spray is found and in areas where agricultural chemicals are widely distributed.

The following example is included to illustrate embodiments of the invention and to demonstrate the usefulness of the coatings on the insulators and is not intended to limit in any way the scope of protection for the invention.

EXAMPLE

To 43.10 weight percent of a hydroxyl terminated dimethyl polysiloxane polymer having a viscosity of 10 Pa.S at 25° C. is added 2.59 weight percent of fumed silica having a specific gravity of 2.2 and surface area of about 130m²/g. Then 3.45 weight percent of a grey pigment is added and the composition is mixed in a planetary mixer for about 15 minutes.

Then 2.59 weight percent of methyl tris-(methyl ethyl ketoxime)silane and 1.15 weight percent of N-(2 aminoethyl-3 aminopropyl)trimethoxysilane are added and mixed for about 20 minutes under a nitrogen atmosphere. Then 46.55 weight percent of alumina trihydrate consisting of 65.1 percent $Al_2O_3$, 34.5 percent combined $H_2O$, 0.3 percent $Na_2O$, 0.02 percent $CaO$, 0.01 percent $SiO_2$ and having a specific gravity of 2.42 is added in stages and mixed for about 15 minutes. Then 61.33 weight percent of 1,1,1 trichloroethane solvent is added to the mixture and mixed for 15 minutes under a nitrogen atmosphere.

Finally, 0.15 weight percent of dibutyltindilaurate is added to the dispersion and further mixed for 10 minutes under a nitrogen atmosphere.

The resultant composition has a skin-over time of 15 minutes and a tack free time 40 minutes.

MEASUREMENT OF LEAKAGE CURRENT

Coating samples are prepared by dipping porcelain rods, 19 mm in diameter and 152 mm in length, into the mixture prepared according to the above Example and exposing the rods to normal atmosphere for cross-linking. Three dips are performed to obtain an average coating thickness of 0.5±0.05 mm. Disk-type electrodes of graphite are attached to the ends of the rods using a silicone adhesive. The specimens are suspended in a test chamber and energized at 0.5 kV/cm average stress. Salt-fog is created by spraying salt water having an electrical conductivity of 900 μS/cm. Leakage current is continuously monitored by a micro-computer data acquisition system.

The importance of the amount of filler in the composition has been demonstrated in accelerated laboratory tests in a salt-fog chamber. Coated insulators were prepared according to the above with the filler concentration varying between 50 and 200 parts by weight of the polyorganosiloxane base and the results of current leakage tests shown in FIG. 1. FIG. 1 shows the time required to develop leakage current in excess of 150 mA over the surface of a coated insulator as a function of the amount of filler at a voltage stress of 0.5 kV/cm. A filler level either below or above the optimum composition gives rise to the development of leakage current in a time that either increases or decreases with the amount of filler. The ideal composition has a filler concentration in the range of 90 to 100 parts by weight of the polyorganosiloxane base.

The reduction in leakage current has also been demonstrated in accelerated laboratory tests in a salt-fog chamber.

Samples coated with the composition according to the above example (CSL 570), a composition available from Dow Corning presumed to be covered by U.S. Pat. No. 4,476,155 and two different compositions from Wacker Silicones one of which is commercially available in North America (Wacker Blue) and the other in Europe (Wacker Grey) were prepared-- current with salt-fog cycles after one hour (in B) and after ten hours (in A) of salt-fog. The salt-fog cycles comprise of 10 hours of fog followed by a 20 hour dry period. Coatings applied to insulators according to the present invention, show leakage currents much less than coatings made from according to prior art.

While the invention has been described in reference to specific embodiments thereof, it should be understood by those skilled in the art that various changes can be made and equivalents may be substituted without departing from the true spirits and scope of the invention. All such modifications are intended to be within the scope of the claims appended hereto.

We claim:

1. An organopolysiloxane rubber composition for coating high voltage electrical insulators comprising the product which is obtained by mixing the following:
   a) 30 to 50 weight percent of a mixture of
      i) 40 to 44 weight percent of polydimethyl siloxane fluid of the formula $$HO[(CH_3)_2SiO]_nH$$

wherein n has an average value such that the viscosity is in the range, from 10 to 15 Pa.S at 25° C;
      ii) 2 to 3 weight percent of a reinforcing filler of the formula $$SiO_2$$

with a specific gravity of 2.2 and a range of particle size 0.5 to 10 microns,
      iii) 1 to 3 weight percent of an organosilicon cross-linking agent of the formula $$RSi(ON=CR'_2)_3$$

wherein R and R' represent a group of monovalent hydrocarbon radicals,
      iv) 0.5 to 2.0 weight percent of an adhesion promoter of the formula $$NHCH_2CH_2NH_2$$
      $$CH_2$$
      $$CH_2CH_2Si(OMe)_3$$

wherein Me is the methyl radical,
      v) 0.1 to 0.2 percent by weight of a condensation catalyst consisting of an organotin salt of carboxylic acid of the formula $$(C_4H_9)_2Sn(OCOC_{10}H_{20}CH_3)_2,$$

and
   vi) 36 to 48 weight percent of alumina trihydrate, the alumina trihydrate having a median particle size of 13μm, containing 65.1 percent Al$_2$O$_3$, 34.5 percent combined H$_2$O, 0.3 percent Na$_2$O, 0.02 percent CaO, 0.01 percent combined H$_2$O, 0.3 percent Na$_2$O, 0.02 percent CaO, 0.01 percent SiO$_2$ and having a specific gravity of 2.42, the aluminum trihydrate being present in a proportion of 90 to 110 parts by weight per 100 parts by weight of the polyorganosiloxane base;

with 50 to 70 weight percent of a hydrocarbon solvent as a dispersion medium for the above composition.

2. A composition according to claim 1 wherein R and R' are independently selected from the group consisting of alkyl and alkylene.

3. A composition according to claim 1 wherein R and R' are each alkyl.

4. A composition according to claim 1 wherein R and R' are independently selected from the group consisting of methyl, ethyl, propyl, butyl, vinyl and allyl.

5. A composition according to claim 3 wherein R and R' are independently selected from the group consisting of methyl and ethyl.

6. A composition according to claim 1 wherein the solvent is a chlorinated hydrocarbon solvent.

7. A composition according to claim 6 wherein the chlorinated hydrocarbon solvent is a chloroethane.

8. A composition according to claim 7 wherein the chloroethane is 1,1,1-trichloroethane.

9. A composition according to claim 1 further comprising 3 to 4 weight percent of a pigment.

10. A composition according to claim 9 wherein the pigment is a grey pigment.

11. A composition according to claim 1 comprising:
   a) 39.67 weight percent of a mixture of
   i) 43.10 percent of a hydroxyl terminated dimethyl polysiloxane polymer having a viscosity of 10 Pa.S at 25° C.,
   ii) 2.59 weight percent of fumed silica having a specific gravity of 2.2 and surface area of about 130m²/g.
   iii) 2.59 weight percent of methyl tris-(methyl ethyl ketoxime)silane,
   iv 1.15 weight percent of N-(2 aminoethyl-3 aminopropyl)trimethoxysilane,

* * * * *